E. F. SHELLABERGER.
EARTHWORKING IMPLEMENT.
APPLICATION FILED NOV. 5, 1915.
1,198,589.
Patented Sept. 19, 1916.
2 SHEETS—SHEET 2.
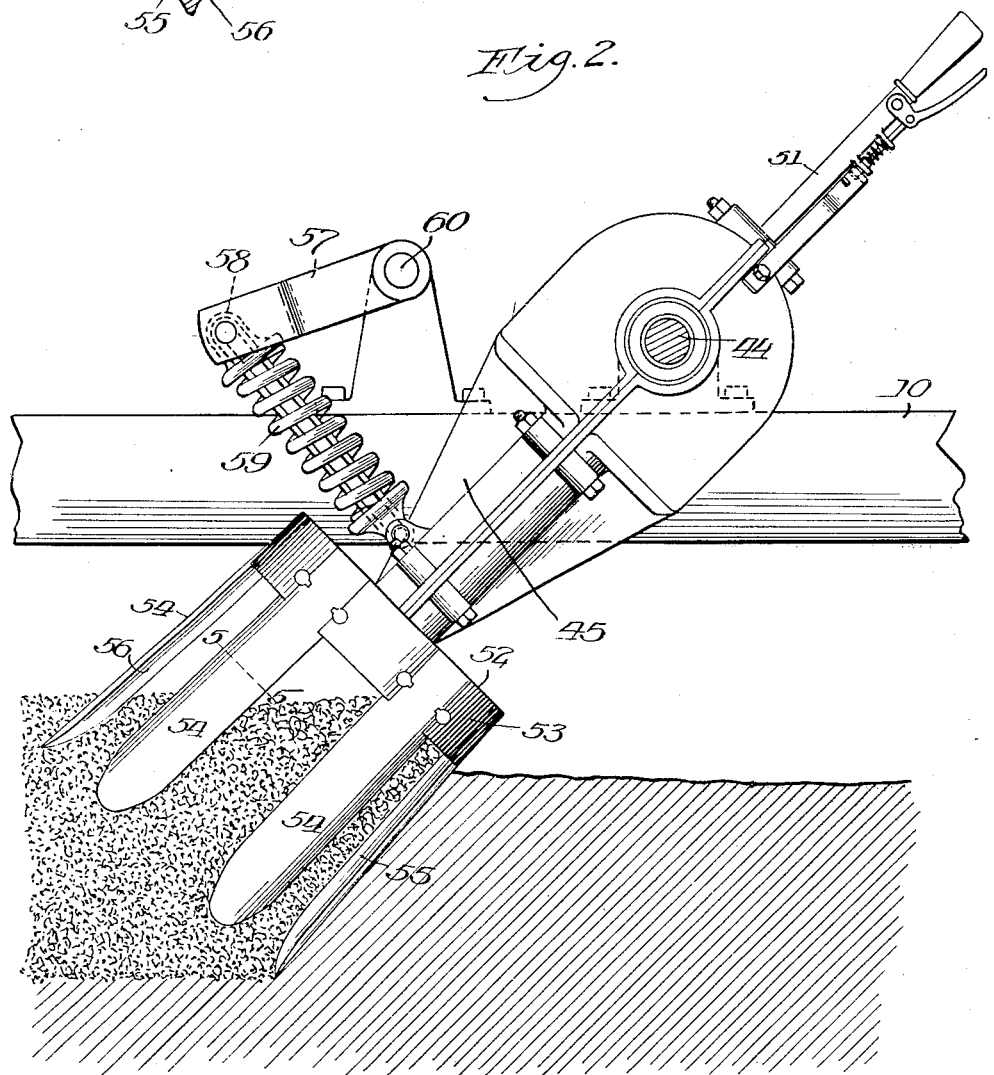

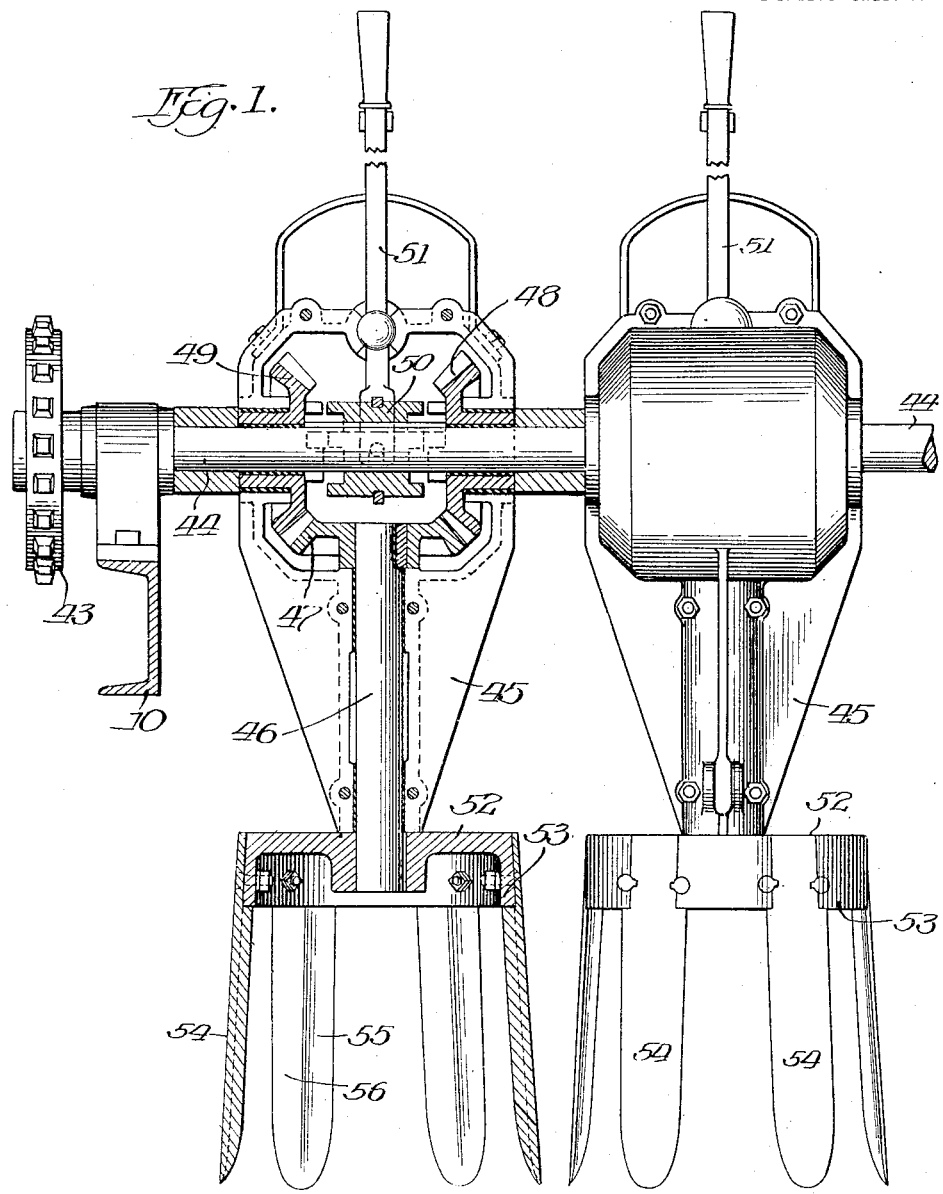

UNITED STATES PATENT OFFICE.

EDWARD F. SHELLABERGER, OF DE KALB, ILLINOIS.

EARTHWORKING IMPLEMENT.

1,198,589.  Specification of Letters Patent.  Patented Sept. 19, 1916.

Application filed November 5, 1915. Serial No. 59,717.

*To all whom it may concern:*

Be it known that I, EDWARD F. SHELLA-BERGER, a citizen of the United States, and resident of De Kalb, in the county of Dekalb and State of Illinois, have invented certain new and useful Improvements in Earth-working Implements, of which the following is a specification.

My invention relates to a motor-driven, wheel-supported earth-working implement adapted for use in the breaking up of soil and preparing a seed bed.

One object is to provide an earth-working tool in the nature of a cutter or digger, which will be possessed of the double function of breaking up the ground and simultaneously preparing it as a seed bed.

In the ordinary plowing operation the soil is turned over, leaving on the surface of the ground a quantity of clods, lumps or irregularities, necessitating a harrowing operation and sometimes a disking operation, before the ground is ready for the reception of the seed. Not only is this uneconomical, but in the harrowing operation the depth to which the soil is worked is necessarily limited. Particularly is this true in heavy soil. To overcome this difficulty, I have conceived the idea of providing a rotary cutter or digger which includes a plurality of cutter blades disposed in a line substantially parallel to the axis of rotation of the implement and arranged in circular form, the periphery of the cutter blades falling within the arc of a circle whose axis is the axis of rotation of the implement. These blades in cross section are preferably of triangular outline, the inner surfaces of the blades, which surfaces join at the inner edge of the blades, being preferably concaved. A blade so constructed will be found to provide an effective cutting edge and at the same time to effectively act as an earth-loosening device.

A further object is to provide means associated with such an earth-working implement for regulably and resiliently causing the entrance of the implement into the soil, including means for reversing the direction of rotation of the implement. Preferably in the use of such an implement a plurality thereof will be disposed side by side, and, in some instances, it may be desirable to operate the same in pairs, throwing the soil in opposite directions by means of the pair of implements, thereby forming alternate ridges and furrows; or, it may be desirable to work the soil back and forth on the same side of the one field. This is not possible in the use of any of the plowing devices known to the applicant.

Stated generally, therefore, the object of my invention is to provide a single implement which will prepare a suitable seed bed, thus avoiding the reworking of the soil by numerous implements, as is now customarily done. To this end I provide a series of earth-working devices each comprising preferably a series of tools or cutters mounted for operation in yieldingly supported frames and adapted to be driven in a circular path, each of the units of the series being under separate control whereby it is adapted to be driven independently of the others, and each of said units being also adapted to be driven in either direction.

The invention will be more readily understood by reference to the accompanying drawings, wherein—

Figure 1 is an enlarged view of two of the earth-working implements, one thereof being shown in vertical section and the other in elevation; Fig. 2 is a side elevation of one of the earth-working implements. Fig. 3 is a section on the line 5—5 of Fig. 2.

Referring more particularly to the drawings it will be seen that I provide a frame 10.

The earth-working implements, best shown in Figs. 1 and 2, include a housing 45, which is mounted for operation on the shaft 44. Mounted within the casing 45 is a shaft 46, having at one end a bevel gear 47. Loosely mounted on the shaft 44, one on each side of the axis of the shaft 46, are bevel pinions 48, 49, having clutch devices on their faces. A clutch device 50 is splined to the shaft 44 and is longitudinally shiftable thereon by means of the lever 51, whereby the clutching device may engage either of the pinions 48, 49, and, consequently, drive the shaft 46 in either of two directions.

Mounted at the outer end of the shaft 46 is the earth-working implement of my invention. This implement may include a head 52 rigidly secured to the shaft and provided with a flange 53 at its periphery. Dovetailed, or otherwise rigidly secured within the flanged portion of the head, are the cutter knives, a cross section view is shown in Fig. 3. It will be noted that the cross section indicates a generally triangular outline, the outer surface 54 of which is formed in the arc of a circle concentric with the axis of rotation of the shaft 46, while the surfaces 55, 56, and which surfaces unite at the inner edge of the tool, are concaved. By forming the knives in this manner a pair of efficient cutting edges is provided, while the concave portion serves to more thoroughly pulverize, agitate and throw the earth. As shown, the knives are arranged in the form of a circle around the periphery of the head 52, the outer ends of the knives flaring slightly. Of course, it will be understood that the setting of the blades will be according to the necessities in each case.

As a means for resiliently holding the pulverizing devices in engagement with the earth, I provide the lever 57, best shown in Fig. 2, connected to the housing 45 through a loop 58 and a coil spring 59, the construction being such that the implement may be positively lifted out of the ground and held in elevated position, but resiliently forced into the ground. By reason of such construction, should the digging implement contact a solid obstruction, it will be permitted to swing on the shaft 44 as a pivot, thereby rising out of engagement with the obstruction. The arm 57 is mounted on a shaft 60 extending transversely of the frame members, which shaft is provided at its overhung end with a worm gear 61. The worm is connected to a suitable reversing mechanism 63 with the shaft 44 carrying the earth-working tool, a lever 64, located near the driver's seat, providing means for operating the reversing mechanism 63 and raising or lowering the earth-working tool as desired.

It will be noted also that the depth of penetration of the earth-working tools, their direction of rotation and the speed of the traction wheels are all controlled from the driver's seat, whereby a single operator only is needed. After having acted upon the soil by means of the device shown, it will be found to be in a pulverized condition through the desired depth, of smooth surface and requiring no harrowing or disking before seeding.

I claim:

1. An earth-working tool comprising a head or support and a series of blades mounted thereon concentric to the axis of said head, and extending therefrom approximately parallel to said axis, each of said blades having cutting edges along its longitudinal sides, substantially as described.

2. An earth-working tool comprising a rotatable head, blades mounted thereon concentric to the axis of said head, and extending therefrom approximately parallel to said axis, said blades having a body portion thickest at the median line and tapering toward the longitudinal edges whereby to provide cutting and earth-turning surfaces, substantially as described.

3. An earth-working implement comprising a rotary head, a series of blades mounted thereon concentric to the axis of said head, and extending therefrom approximately parallel to said axis, a driving arbor, power transmitting means for driving said arbor, and reversing means whereby the tool may be driven in either direction, substantially as described.

4. An earth-working implement comprising a rotary head, a series of blades mounted thereon concentric to the axis thereof, a driving arbor, power transmitting means for driving said arbor, reversing means whereby the tool may be driven in either direction, said blades being thickest at the median line and tapering toward the longitudinal edges whereby to provide cutting and earth-turning surfaces, the outer surface of said blades being convex in section.

Signed at Chicago, Illinois, this 3rd day of November, 1915.

EDWARD F. SHELLABERGER.

Witnesses:
T. D. BUTLER,
H. C. JACOBS.

Copies of this patent may be obtained for five cents each, by addressing the "Commissioner of Patents, Washington, D. C."